United States Patent [19]

Frater

[11] Patent Number: 5,838,518
[45] Date of Patent: Nov. 17, 1998

[54] DISK DRIVE SUSPENSION FOR INCREASING THE ARM TO DISK CLEARANCE

[75] Inventor: Norman K. Frater, Los Gatos, Calif.

[73] Assignee: International Business Machines Corporation, Armonk, N.Y.

[21] Appl. No.: 852,014

[22] Filed: May 6, 1997

[51] Int. Cl.$^6$ .................................................. G11B 5/48
[52] U.S. Cl. .......................................................... 360/104
[58] Field of Search ................................. 360/104, 106

[56] References Cited

U.S. PATENT DOCUMENTS

| | | | |
|---|---|---|---|
| 5,074,029 | 12/1991 | Brooks, Jr. et al. | 29/603 |
| 5,172,286 | 12/1992 | Jurgenson | 360/104 |
| 5,225,949 | 7/1993 | King et al. | 360/104 |
| 5,285,564 | 2/1994 | Imasaki | 29/603 |
| 5,291,360 | 3/1994 | Foote | 360/104 |
| 5,296,984 | 3/1994 | Fick | 360/104 |
| 5,299,081 | 3/1994 | Hatch et al. | 360/104 |
| 5,313,355 | 5/1994 | Hagen | 360/104 |
| 5,355,267 | 10/1994 | Aoyagi et al. | 360/104 |

FOREIGN PATENT DOCUMENTS

| | | | |
|---|---|---|---|
| 0 536 891 A1 | 4/1993 | European Pat. Off. | G11B 5/55 |
| 2-162583 | 6/1990 | Japan | G11B 21/16 |
| 4-364279 | 12/1992 | Japan | G11B 21/21 |
| 6-89521 | 3/1994 | Japan | G11B 21/16 |

OTHER PUBLICATIONS

IBM Document entitled "Arm Mount, Mount Plate" and attached sheet showing suspension (May 12, 1995).

*Primary Examiner*—A. J. Heinz
*Attorney, Agent, or Firm*—Hopkins & Carley; Donald J. Pagel

[57] ABSTRACT

A suspension for use in a magnetic disk drive comprised of a load beam having a first wing and a second wing which wrap around the actuator arm and provide a site for attachment of a wiring tail. A mount plate is positioned over the actuator arm for securing the load beam to the actuator arm. The first wing and the second wing are positioned within the thickness of the actuator arm so that the thickness of the actuator arm/load beam assembly is minimized and the shock loading threshold is increased.

22 Claims, 4 Drawing Sheets

5,838,518

DISK DRIVE SUSPENSION FOR INCREASING THE ARM TO DISK CLEARANCE

TECHNICAL FIELD

The present invention relates to a suspension for use in a magnetic disk drive and more particularly to a suspension in which the clearance between the actuator arm and the magnetic disk is increased by wrapping part of the load beam around the actuator arm.

BACKGROUND ART

A problem with small disk drives is that they can be damaged by impact shocks which cause the arm to contact the surface of the hard disk. This problem is accentuated in large capacity disk drives which pack as many disks and heads as is possible into the available one inch or one and six tenths inch form factor. Although the nominal arm to disk spacing is adequate for design shock loadings, the manufacturing variations in arm to disk stacking can cause the lower tail of the disk drive population to experience arm to disk contact at well below design shock loading threshold. For example, typical small disk drives have nominal arm to disk clearances in the range of 0.36 to 0.39 mm. With these dimensions, arm to disk contact usually will not result unless an impact exceeds a force of 120 to 130 g's ("g" is the force exerted by gravity or about 9.81 m/sec$^2$). However, when typical manufacturing variations are taken into consideration, this threshold can drop to 60 to 70 g's if the worst case combination of tolerances occurs. Typically, the worst case scenario would results in arm to disk clearances that are 50% less than the nominal design.

A solution to this problem is to increase the spacing between the arm/suspension assembly and the disks. However, frequently the freedom to increase the arm to disk spacing is limited by design considerations in the suspension assembly. For example, FIG. 1 illustrates a suspension system 10 of the prior art that utilizes the electrical wiring methodology disclosed in U.S. Pat. No. 5,074,029. The system 10 comprises an arm 14 and a suspension 18. The arm 14 is adapted to attach to an actuator and includes a mount section 22 and an aperture 26 which extends through the mount section 22. The suspension 18 comprises an elongated load beam 30 that supports a magnetic read/write slider 34. The suspension 18 includes a first wing 38 and a second wing 42. The mount section 22 is positioned over the load beam 30. A mount plate 114 (also shown in FIG. 3) is positioned over a central section of the load beam 30 between the wings 38 and 42 so that this section of the load beam 30 is sandwiched between the mount section 22 and the mount plate 114. The wings 38 and 42 extend out from the sides of the mount plate.

In the system 10, the wings 38 and 42 are needed in order to provide sites for the positioning tail shown in U.S. Pat. No. 5,074,029 to attach to. However, having a portion of the load beam 30 sandwiched between the arm 22 and the mount plate 114 reduces the arm to disk clearance. Therefore, what is needed is a suspension design that retains the wings 38 and 42, but that eliminates the part of the load beam positioned between the wings that reduces the arm to disk clearance.

SUMMARY OF THE PRESENT INVENTION

The present invention comprises a suspension for use in a magnetic disk drive comprising an elongated load beam having a first end and a second end. A magnetic read/write slider is attached to the first end and a first wing and a second wing extend from the second end. An open area bounded by the first wing, the second wing and the second end of the elongated load beam provides a space into which an actuator arm can fit. The first wing and the second wing are positioned so as not to extend outside of the thickness of the actuator arm. A mount plate is positioned over the actuator arm, in contact with a surface of the actuator arm, and is attached to the first wing and the second wing. Because the first wing and the second wing are not positioned between the actuator arm and the mount plate, the thickness of the mount plate/actuator arm assembly is minimized as compared to similar assemblies of the prior art. The reduced thickness of the mount plate/actuator arm assembly results in more clearance between the mount plate and the magnetic disk, thereby increasing the shock threshold for a disk file that utilizes the suspension.

DETAILED DESCRIPTION OF THE PREFERRED EMBODIMENT

Figure 2:
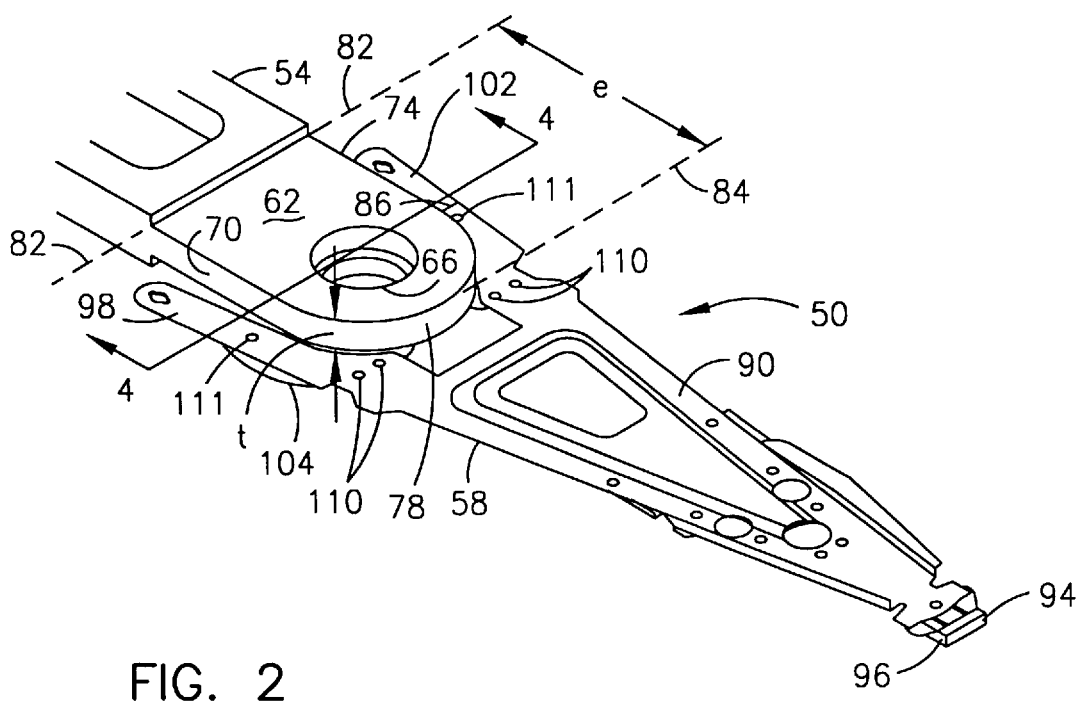
FIG. 2 is an isometric view of part of a suspension system according to the present invention.

FIG. 2 illustrates part of a suspension system 50 of the present invention. The system 50 comprises an arm 54 and a suspension 58. The arm 54 attaches to an actuator (such as actuator 270 shown in FIG. 7) and includes a mount section 62 and an aperture 66 which extends through the mount section 62. The mount section 62 comprises the portion of the arm 54 which is contained between (circumscribed by) a first edge 70, a second edge 74, a third edge 78 and a reference line 82. The mount section 62 has a thickness "t." The third edge 78 is curved (arcuate) and defines the distal end of the arm 54. A reference line 84 indicates the tip of the third edge 78 and the reference line 82 is separated from the reference line 84 by a distance "e." The distance "e" represents the length of the mount section 62, which in the preferred embodiment is approximately 7.6 mm. The reference line 82 denotes the proximal end of the mount section 62. Objects positioned between the aperture 66 and the line 82 are said to be positioned proximally to the aperture 66. Objects positioned between the aperture 66 and the edge 78 are said to be positioned distally to the aperture 66. A reference line 86 is indicated on the wing 102.

The suspension 58 is a separate piece from the arm 54 and comprises an elongated load beam 90 that supports a magnetic read/write slider 94 having an air-bearing surface 96.

The suspension 58 includes a first wing 98 and a second wing 102. The first wing 98 wraps around the mount section 62 and is positioned adjacent to the first side 70. The second wing 102 wraps around the mount section 62 and is positioned adjacent to the second side 74. The suspension 58 is positioned so that the first wing 98 and the second wing 102 do not extend above or below the thickness "t" of the mount section 62 in the region adjacent to the mount section (i.e. along the edges 70, 74 and 78). A mount plate 104 is positioned under the mount section 62 and is attached to the first wing 98 and the second wing 102 at a plurality of attachment sites 110. In this configuration, no part of the wings 98 or 102 is positioned above or below the mount section 62 (i.e. outside of the thickness "t"). The magnetic read/write slider 94 is positioned on the same side of the suspension 58 as the mount plate 104. It should be noted that in the preferred embodiment, the suspension 58 is comprised of a continuous piece of material. The load beam 90 and the wings 98 and 102 are all just sections of the continuous piece of material, not separate pieces that are joined together. In other embodiments, separate pieces could be used. A proximal attachment site 111 is located on the wing 98 and on the wing 102. The proximal attachment sites 111 are identical to the attachment sites 110 and attach the wings 98 and 102 to the mount plate 104, but are positioned proximally to the sites 110. The reference line 86 is positioned proximally to the attachment site 111 on the wing 102.

Figure 1:
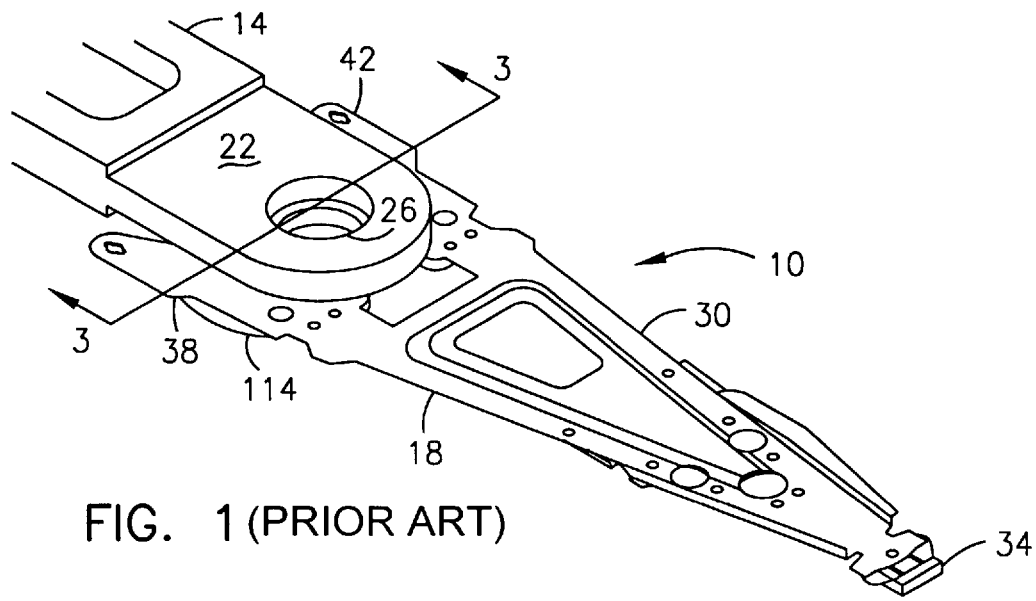
FIG. 1 is an isometric view of part of a suspension system according to the prior art.
Figure 3:
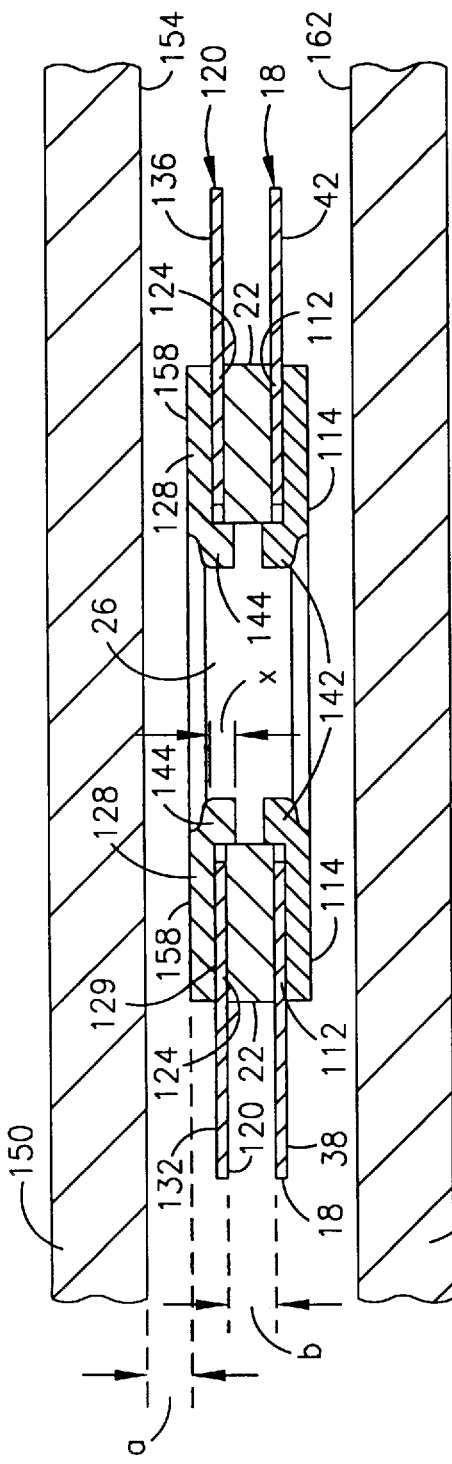
FIG. 3 is a cross-sectional view taken along the line 3—3 of FIG. 1.

FIG. 3 is a cross section of the suspension system 10 (prior art) showing additional elements not shown in FIG. 1. The suspension 18 includes a central section 112 which is positioned between a mount plate 114 and the mount section 22. The central section 112 is the portion of the suspension 18 that extends from the wing 38 to the wing 42. The first wing 38 and the second wing 42 extend out beyond the mount section 22 and the mount plate 114. A second suspension 120 is positioned on the opposite side of the mount section 22 from where the suspension 18 is attached. The second suspension 120 includes a central section 124 which is positioned between a mount plate 128 and the mount section 22. The mount plate 128 includes a surface 129 which is in contact with the central section 124 in the horizontal direction. A first wing 132 and a second wing 136 extend out beyond the mount section 22 and the mount plate 128. Mount plate 114 includes a swage spud 142 for attaching mount plate 114 to the mount section 22. The swage spud 142 is a portion of the mount plate 114 which extends beyond the end of the mount section 22 and into the aperture 26. Similarly, the mount plate 128 includes a swage spud 144 which extends into aperture 26 for attaching mount plate 114 to the mount section 22.

The mount plates 114 and 128 are secured to the mount section 22 by forcing a steel ball through the aperture 26 which expands the swage spuds 142 and 144. The expansion of the swage spuds 142 and 144 causes a friction interface to form between the expanded spuds and the aperture 26, thereby securing the mount plates 114 and 128 to the mount section 22. Before the swage spud 144 is expanded, it has a length "x" which extends from the bottom of the swage spud 144 up to the surface 129 of the mount plate 128. Similarly, the swage spud 142 has a length equal to the length "x."

A disk 150 is positioned adjacent to the mount plate 128. The disk 150 includes a surface 154 which faces a surface 158 of the mount plate 128. The surface 154 is separated from the surface 158 by a distance "a" and data is read and written on the surface 154 by a transducer mounted on a slider (identical to the slider 34) which is attached to the suspension 120. The suspensions 18 and 120 are separated at their closest points by a distance "b." In disk files of the prior art, the distance "a" is approximately 0.36 mm and the distance "b" is approximately 0.57 mm. Similarly, a disk 160 is positioned adjacent to the mount plate 114 and has a surface 162 on which data is read and written by a transducer mounted on the slider 34 attached to the suspension 18.

Figure 4:
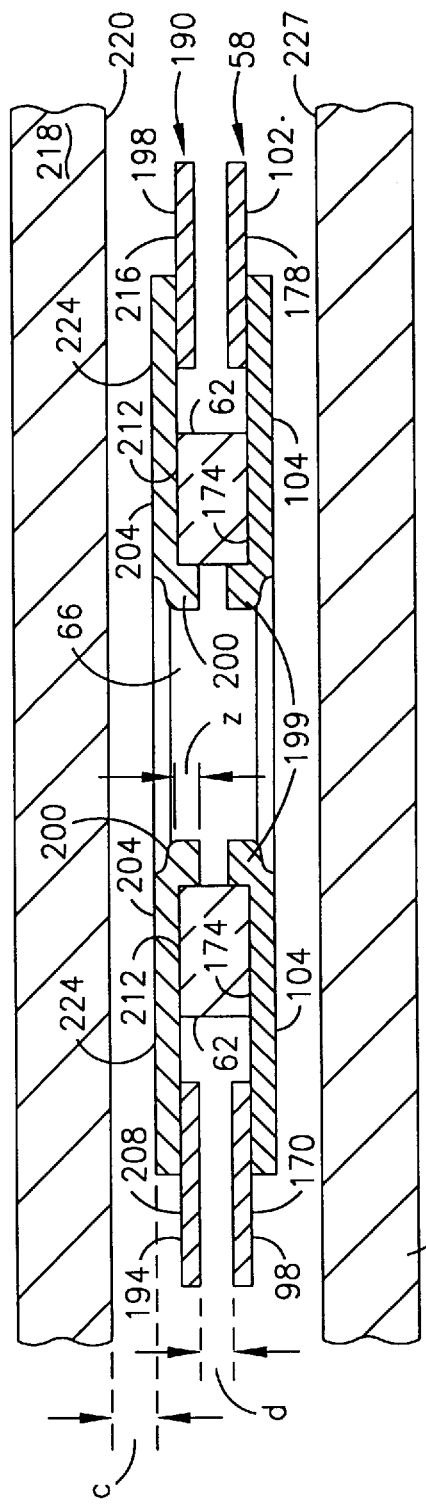
FIG. 4 is a cross-sectional view taken along the line 4—4 of FIG. 2.

FIG. 4 is a cross section of the suspension system 50 of the present invention showing additional elements not shown in FIG. 2. In the suspension system 50 the first wing 98 and the second wing 102 wrap around the mount section 62 so that no part of the wing 98 and no part of the wing 102 is positioned between both the mount section 62 and the mount plate 104 in the vertical direction (i.e. the wings 98 and 102 are not sandwiched between the mount section 62 and the mount plate 104). In the preferred embodiment, a bottom surface 170 of the wing 98 is coplanar with a first surface 174 of the mount section 62. Similarly, a bottom surface 178 of the wing 102 is coplanar with the surface 174. The mount plate 104 is in contact with portions of all three of the surfaces 170, 174 and 178, and is attached to the suspension 58, generally by laser welding at the attachment sites 110 (shown in FIG. 2). The mount plate 104 includes a swage spud 199 that extends into the aperture 66 and attaches the mount plate 104 to the mount section 62 (and hence to the arm 54) as was described previously with respect to the swage spud 142 shown in FIG. 3.

Figure 8:
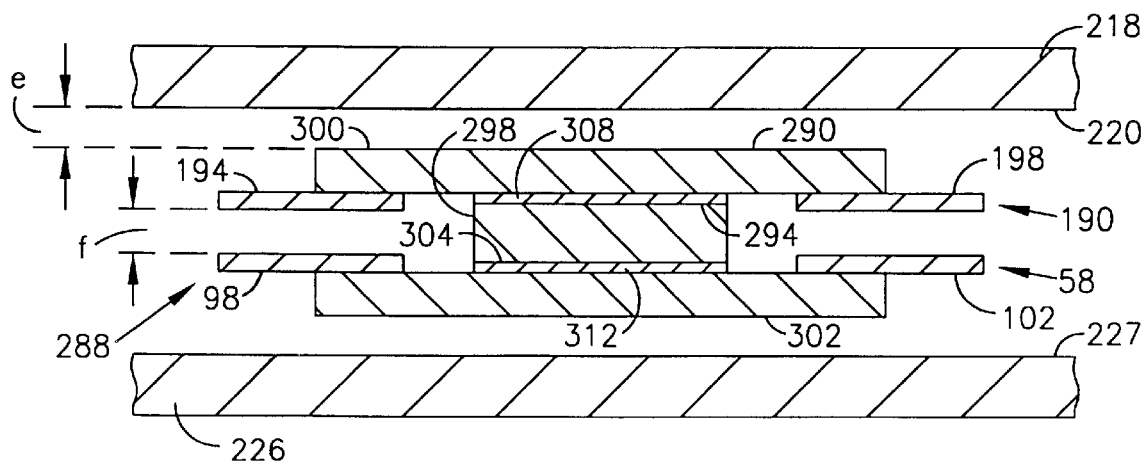
FIG. 8 is a cross-sectional view of an alternative embodiment of the present invention.

In an alternative embodiment, the mount plate 104 could be secured to the mount section 62 by a different method, such as by gluing the mount plate 104 to the mount section 62 (see FIG. 8). In such a case, the aperture 66 may not be present in the mount section 62.

In the preferred embodiment, a second suspension 190 is attached to the arm 54. The suspension 190 is identical to the suspension 58 and includes a first wing 194 and a second wing 198. The first wing 194 and the second wing 198 wrap around the mount section 62 so that no part of the wing 194 and no part of the wing 198 is positioned between both the mount section 62 and a mount plate 204 in the vertical direction (i.e. the wings 194 and 198 are not sandwiched between the mount section 62 and the mount plate 204). The mount plate 204 includes a swage spud 200 that extends into the aperture 66 and attaches the mount plate 204 to the mount section 62 (and hence to the arm 54) as was described previously. In other embodiments, only one of the suspensions 58 or 190 need be present. An example of this is a disk file where the top and bottom arms generally only have one suspension attached.

In the preferred embodiment, a first surface 208 of the wing 194 is coplanar with a second surface 212 of the mount section 62. Similarly, a first surface 216 of the wing 198 is coplanar with the second surface 212. The mount plate 204 is in contact with portions of all three of the surfaces 208, 212 and 216, and is attached to the suspension 190, generally by welding at a plurality of attachment sites positioned on the wings 194 and 198 (analogous to the attachment sites 110 shown in FIG. 2). The swage spud 200 extends through the aperture 66 and attaches the mount plate 204 to the mount section 62, and hence to the arm 54. The swage spud 200 has a length "z" which extends from the bottom of the swage spud 200 up to the surface 212. Similarly, the swage spud 199 has a length equal to the length "z."

A disk 218 is positioned above the suspension 190 adjacent to the mount plate 204. The disk 218 includes a surface 220 which faces a surface 224 of the mount plate 204. The surface 220 is separated from the surface 224 by a distance "c" and data is read and written on the surface 220 by a slider attached to the suspension 190. The wing 98 and the wing 194 are separated at their closest points by a distance "d." In the preferred embodiment, the distance "c" is approximately 0.42 mm and the distance "d" is approximately 0.44 mm. Similarly, a disk 226 is positioned adjacent to the mount plate 104 and has a surface 227 on which data is read and written by a transducer supported by the slider 94 attached to the suspension 58. The suspension system 50 is usually centered so that the suspensions 58 and 190 are equidistant from the disks 226 and 218, respectively.

Comparison of the distance "a" in FIG. 3 with the distance "c" in FIG. 4 shows that the distance between the mount plate 204 and the disk 218 is about 0.064 mm greater in the present invention (FIG. 4) than in the prior art (FIG. 3). This increased distance is important because it provides a greater shock loading threshold for the suspension system 50. Typically, the 0.064 mm gain will increase the shock loading threshold in the present invention by about 21 g's over the prior art design.

It should also be noted that the swage spuds 199 and 200 in FIG. 4 are shorter than the swage spuds 142 and 144 shown in FIG. 3 (i.e. the length "z" is less than the length "x"). Specifically, the swage spuds 199 and 200 are shortened by an amount equal to the thickness of the wing 98 or the wing 194, respectively. This gives the same area of engagement between the swage spuds 199 and 200 and the mount section 62 in the present invention, as exists between the swage spuds 142 and 144 and the mount section 22 in the prior art. In the preferred embodiment, the length "z" is approximately 0.21 mm whereas the length "x" of the prior art is approximately 0.27 mm.

The distance "c" can be increased even further by reducing the thickness "t" of the mount section 62 (the thickness "t" is illustrated in FIG. 2). In the preferred embodiment, the thickness "t" is approximately 0.57 mm. In an alternative embodiment, the thickness "t" can be reduced to approximately 0.50 mm before the mount section becomes too weak to support the engagement of the swage spuds 199 and 200. If the thickness "t" is reduced to 0.50 mm, then the length of the swage spuds 199 and 200 has to be reduced to about 0.18 mm. Reducing the thickness "t" to 0.50 mm would increase the distance "c" to about 0.46 mm, which would increase the shock threshold by an additional 12 g's over the design for the system 50 used with a 0.57 mm arm, and by about 33 g's over the design for the prior art system 10 used with a 0.57 mm arm.

Figure 5:
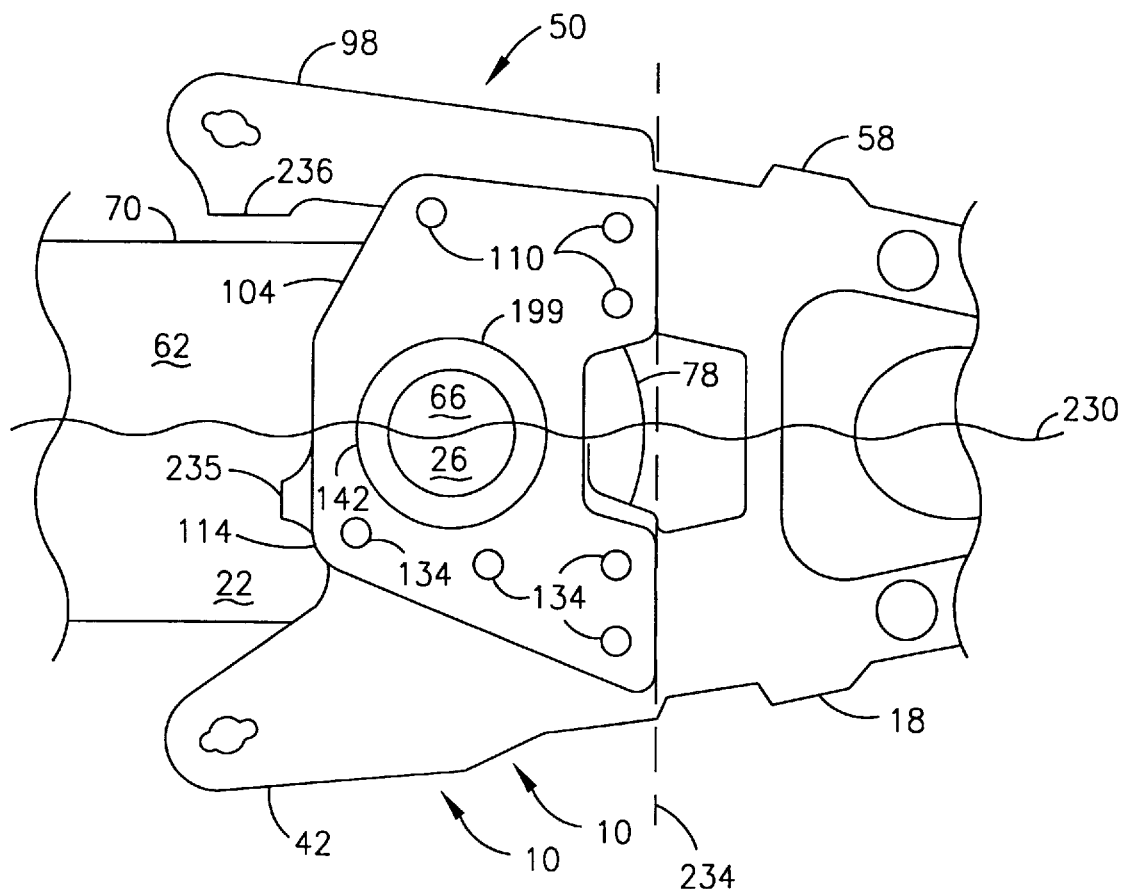
FIG. 5 is a top view showing half of the suspension system of the prior art and half of the suspension system of the present invention artificially combined into a single suspension system.

FIG. 5 is a schematic diagram in which half of the suspension system 10 and half of the suspension system 50 are artificially combined for the purpose of comparing the relative mass of the two suspension systems. In FIG. 5, a line 230 separates the suspension system 50 of the present invention from the suspension system 10 of the prior art. In the suspension system 50, the wing 98 extends proximally beyond the swage spud 199 and runs adjacent to the edge 70 of the mount section 62. The mount plate 104 is positioned over the mount section 62 and the wing 98 and is attached to the suspension system 50 at the attachment sites 110. For example, the attachment sites 110 may be laser welded. The swage spud 199 is a circular part of the mount plate 104 that fits into the aperture 66 and functions to secure the mount plate 104 to the arm 62.

In the suspension system 10, the wing 42 extends proximally beyond the swage spud 142 and is positioned over the mount section 22 between the mount section 22 and the mount plate 114. The mount plate 114 is attached to the suspension system 10 at a plurality of attachment sites 134.

At all points beyond a line 234, on the same side of the line 234 as the slider is located, the suspensions 10 and 50 are identical. The parts of the suspensions 10 and 50 located on the other side of the line 234 (i.e. on the side with the apertures 26 and 66) comprise the base section of the suspension 10 and the base section of the suspension 50.

The suspension 10 includes a breakaway tab 235 which is positioned in a different location than a breakaway tab 236 on the suspension 50. The tabs 235 and 236 both represent the sites where the load beams are attached to a strip frame during their manufacture. Additionally, it should be noted that the attachment sites 110 in the suspension 50 are moved out slightly (away from the line 230) relative to the analogous attachment sites 134 in the suspension 10.

The purpose of FIG. 5 is to illustrate the technique that is used to compensate for the relative mass change caused by the wrap-around design used in the suspension system 50. In order to wrap the suspension 58 around the mount section 62, the mount plate 104 has to increase in width so as to provide adequate support for the wings 98 and 102. Increasing the size of the mount plate 114 adds undesirable mass to the system 50 which is detrimental to the accessing speed and balancing of the actuator assembly. By removing the same amount of mass from the suspension 58 as is added to the mount plate 114, the net mass of the systems 10 and 50 can be kept the same. The solution is not trivial because adequate clearance must be provided between the suspension 58 and the edges of the mount section 62, and because the wings 98 and 102 must be adequately supported to allow the plastic tail to be used in the wiring process (i.e. the process illustrated in U.S. Pat. No. 5,074,029).

Comparison of the suspension system 10 and the suspension system 50 in FIG. 5 shows that the wing 42 is wider than the wing 98. Specifically, the wing 42 extends completely across the mount section 22 and surrounds the swage spud 142 as is illustrated in FIG. 3. In contrast, the wing 98 does not extend across the mount section 62. Similarly, in the actual suspensions 18 and 58 (shown in FIGS. 1 and 2, respectively), the wing 42 is wider than the wing 102 and the wing 38 is wider than the wing 98. This difference in width between the wings 38 and 42, in the suspension 18, and the wings 102 and 98, in the suspension 58, results in the base section of the suspension 18 having a relative mass of about 1.645, whereas the base section of the suspension 58 has a relative mass of about 0.828.

In order to compensate for the difference in relative masses between the suspensions 18 and 58, the relative mass of the mount plate 104 is increased in relation to the relative mass of the mount plate 114. This is accomplished by widening the mount plate 104 in the dimension between the swage spud 199 and the wing 98 and in the dimension between the swage spud 199 and the wing 102. With this adjustment, the mount plate 104 has a relative mass of 3.553 compared to a relative mass for the mount plate 114 of approximately 2.736. Adding the appropriate figures gives identical relative masses for the base sections of the suspension systems 10 and 50 of approximately 4.381.

Figure 6:
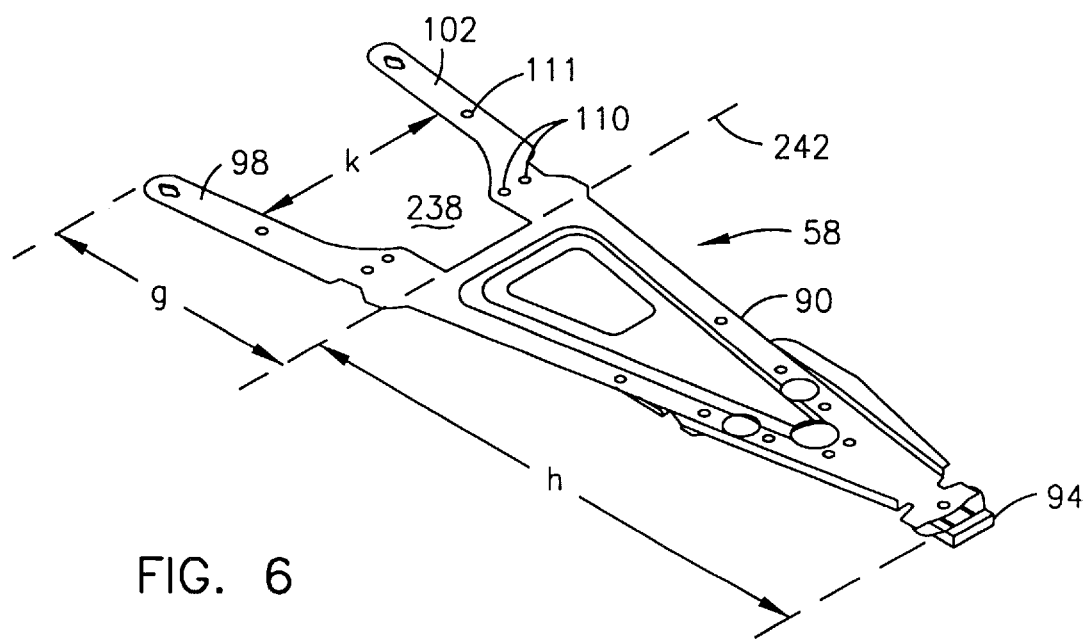
FIG. 6 is an isometric view of a load beam according to the present invention.

FIG. 6 illustrates that a region 238 exists between the wings 98 and 102 and a line 242 which is an empty space. The region 238 allows the suspension 58 to wrap around the mount section 62 of the arm 54. The line 242 extends transversely across the suspension 58 and denotes the distal end of the region 238 (i.e. to the end of the region 238 that is closest to the slider 94). The absence of any support structure in the region 238 also necessitates that the mount plate 114 provide the required support for the wings 98 and 102. In the prior art suspension 18, the region 238 is occupied by the central section 112 (shown in FIG. 3). The wings 98 and 102 have a length "g" of approximately 9.3 mm measured from the line 242 which borders on one edge of the region 238. The remainder of the suspension 58 has a length "h" of approximately 17.4 mm. At the approximate midpoint of the length "g," the wings 98 and 102 are separated by a distance "k" of about 6.4 mm. Using the dimensions given above, the ratio of the length "g" to the length "h" is 0.534. Generally, for purposes of the present invention, at least one of the wings 98 or 102 needs to be long enough so that the ratio of the length "g" to the length "h" is at least 0.30.

Figure 7:
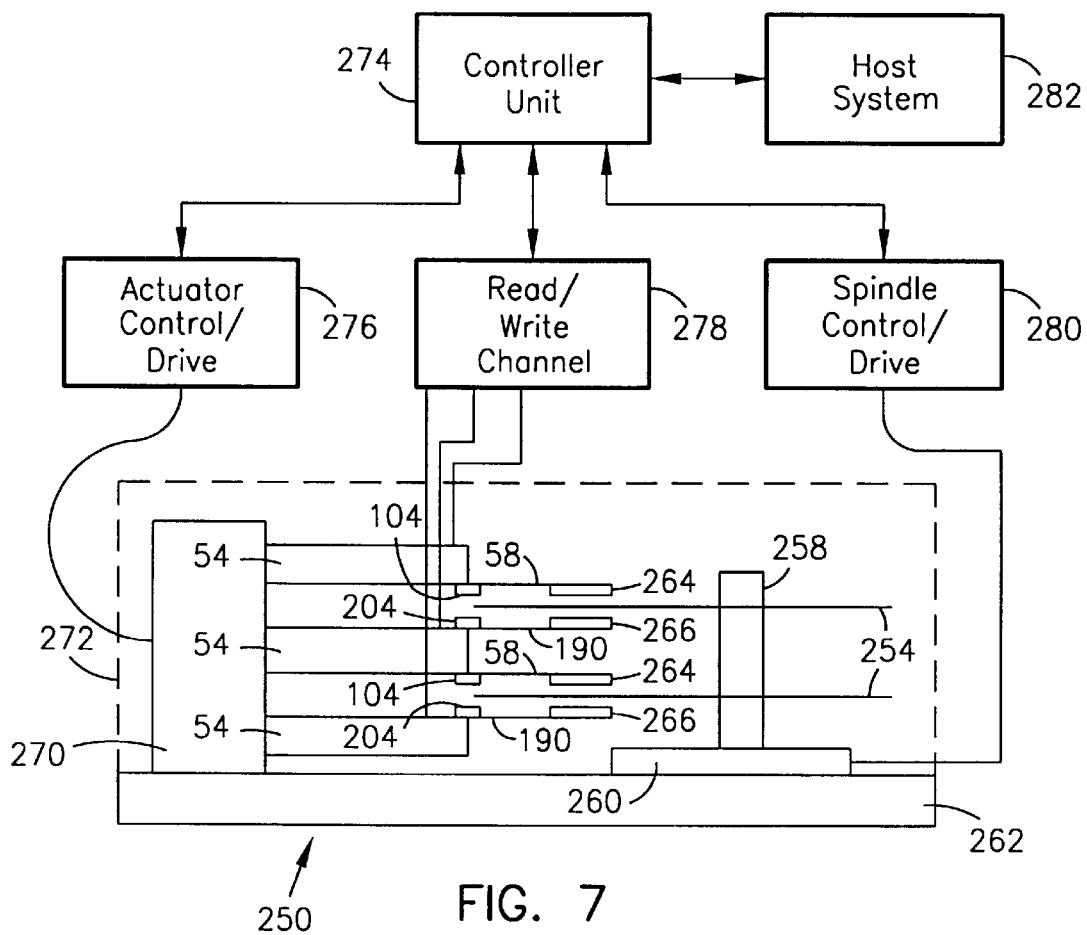
FIG. 7 is a schematic view of a disk file that utilizes the present invention.

FIG. 7 is a schematic diagram of a magnetic recording disk file 250 that utilizes the suspension system 50 of the present invention. It should be appreciated that the suspension system 190 is identical to the suspension system 50 so that the following comments apply equally to either the suspension system 50 or the suspension system 190.

The disk file 250 includes a plurality of magnetic recording disks 254 suitable for use in hard disk drives. The disks 254 are mounted on a spindle shaft 258 which is connected to a spindle motor 260. Motor 260 is mounted to a chassis 262.

A plurality of read/write sliders 264 and 266 are positioned over the disks 254 such that each disk 254 can be accessed by one of the sliders 264 or 266. Each of the sliders 264 and 266 includes a transducer for reading and writing data on a plurality of concentric data tracks on the disks 254, and are attached to one of the suspension systems 50 (or 190). The mount plate 104 is on the same side of the suspension system 50 as the slider 264 and the mount plate 204 is on the same side of the suspension system 190 as the slider 266.

Each of the suspension systems 50 (or 190) are attached to one of the actuator arms 54, each of which are attached to an actuator 270, such as a rotary or linear actuator. The actuator 270 moves the actuator arm 54 (and hence the suspension system 50 or 190 and the sliders 264 or 266) to different radial positions on the disk 254. An enclosure 272 (shown by a broken line in FIG. 7) seals the disk file 250 and provides protection from particulate contamination.

A controller unit 274 provides overall control to the magnetic recording disk file 250. The controller unit 274 contains a central processing unit (CPU), memory unit and other digital circuitry and is connected to an actuator control/drive unit 276 which in turn is electrically connected to the actuator 270. This allows the controller unit 274 to control the movement of the sliders 264 and 266 over the disks 254. The controller unit 274 is electrically connected to a read/write channel 278 which in turn is electrically connected to the sliders 264 and 266. This allows the controller unit 274 to send and to receive data from the disks 254.

The controller unit 274 is electrically connected to a spindle control/drive unit 280 which in turn is electrically connected to the spindle motor 260. This allows the controller unit 274 to control the rotation of the disks 254. A host system 282, which is typically a computer system, is electrically connected to the controller unit 274. The host system 282 may send digital data to the controller unit 274 to be stored on the disks 254, or may request that digital data be read from the disks 254 and sent to the host system 282. The basic operation and structure of data storage systems, such as the disk file 250 (without the suspension systems 50 or 190), is well-known in the art.

In the preferred embodiment, the electrical connection between the read/write slider 264 (or 266) and the read/write channel 278 includes wires which are strung along the suspension 58 and are connected to the slider 264 (or 266). The wires are strung using an automated wiring methodology such as is described in U.S. Pat. No. 5,074,029. In this method, the wings 98 and 102 provide a site for a plastic wiring tail, such as the tail 34 shown in FIG. 2 of U.S. Pat. No. 5,074,029, to attach to. For this reason it is important to keep the wings 98 and 102 in the present design. However, by wrapping the wings 98 and 102 around the mount section 62, the distance "c" (shown in FIG. 4) is increased relative to the prior art, thereby increasing the shock loading threshold as was described previously. Additionally, by keeping the mass of the suspension system 50 approximately the same as the mass of the suspension system 10, the suspension system 50 can be used in place of the suspension system 10 without readjusting design parameters or retooling manufacturing equipment, such as the equipment required for automatic wiring of the suspension.

It should be noted that in alternative embodiments, a suspension can be used having only a single elongated wing and still accomplish all of the objectives listed above. For example, a suspension could be used having an elongated wing 98 exactly as described above. The second wing (i.e. wing 102) could be terminated at the reference line 86 shown in FIG. 4. In this case, the wing 102 won't necessarily extend beyond the aperture 66. The reference line 86 is positioned proximally to the attachment site 111 so that the mount plate 104 is adequately attached to the wings 98 and 102. The wing 102 can be shorter than the wing 98 because only one elongated wing is actually utilized in the wiring process described in U.S. Pat. No. 5,074,029.

FIG. 8 illustrates a suspension system 288 which is an alternative embodiment of the present invention. In FIG. 8, elements which are identical to elements described previously with respect to FIG. 4 have the same reference numeral as in FIG. 4. In the suspension system 288, the mount plates are attached to the actuator arm with an adhesive substance. An upper mount plate 290 extends from the first wing 194 to the second wing 198 and passes over an upper surface 294 of a mount section 298. The mount plate 290 includes a surface 300 positioned adjacent to the surface 220 of the disk 218. Similarly, a lower mount plate 302 extends from the first wing 98 to the second wing 102 and passes over a lower surface 304 of the mount section 298. The mount section 298 is similar to the mount section 62 except that it does not include the aperture 66 (i.e. the mount section 298 is solid). Of course, in alternative embodiments, the aperture 66 could be retained.

In the preferred embodiment, the system 288 comprises two suspensions per arm, such as the suspensions 190 and 58 attached to the mount section 298. In alternative embodiments, the system 288 could be comprised of a single suspension attached to the mount section 298 (e.g. one of the suspensions 190 or 58 could be deleted). Also, as described previously, one of the wings 98 or 102 can be shorter than the other wing.

The mount plate 290 is attached to the upper surface 294 using an adhesive substance such as a cyanoacrylate adhesive (e.g. Loctite 380 Black Max brand adhesive). Similarly, the mount plate 302 is attached to the lower surface 304 of the mount section 298 with the same adhesive substance. An adhesive section 308 indicates the region in which the adhesive substance attaches the mount plate 290 to the upper surface 294, and an adhesive section 312 indicates the region in which the adhesive substance attaches the mount plate 302 to the lower surface 304.

The first and second wings 194 and 198 are attached to the mount plate 290 with laser welds as was described previously with respect to FIGS. 4 and 5. Similarly, the first and second wings 98 and 102 are attached to the mount plate 302 with laser welds.

In FIG. 8, the surface 220 is separated from the surface 300 by a distance "e." The wings 98 and 194 are separated at their closest points by a distance "f." Because the adhesive layer 308 has a negligible thicknesses, the distance "e" is approximately equal to the distance "c" (shown in FIG. 4) or about 0.42 mm. Similarly, the distance "f" is approximately equal to the distance "d" (shown in FIG. 4) or about 0.44 mm. Therefore, in the alternative embodiment 288, the distance between the mount plate 290 and the disk 218 is approximately 0.064 mm greater than in the prior art system illustrated in FIG. 3, for the same reasons discussed previously with respect to FIG. 4. Note that in FIG. 8, the thicknesses of the adhesive layers 308 and 312 are exaggerated. In reality, this thickness is negligible so that the surface 294 is essentially even with the top of the wings 194 and 198, and the surface 312 is essentially even with the bottom of the wings 98 and 102.

The distance "e" can be increased even further by reducing the thickness of the mount section 298. Since adhesive bonding embodiment does not require spacing for the swage spuds 199 and 200, and does not mechanically distort the mount section like the expansion of the swage spud discussed previously, the thickness of the mount section 298 can be reduced even smaller than 0.5 mm. Reducing the thickness "t" to 0.40 mm would increase the distance "e" to about 0.51 mm, which would increase the shock threshold by an additional 28 g's over the design for the system 50 used with a 0.57 mm arm, and by about 49 g's over the design for the prior art system 10 used with a 0.57 mm arm.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A suspension system for use in a magnetic disk drive comprising:

an elongated section for supporting a read/write transducer and having a first end and a second end and a length "h" measured between the first end and the second end;

a first wing having a third end and a fourth end and a length "g" measured between the third end and the fourth end, with the third end of the first wing abutting the second end of the elongated section and the ratio of the length "g" to the length "h" being greater than approximately 0.30;

a second wing having a fifth end and a sixth end with the fifth end of the second wing abutting the second end of the elongated section;

an open area bounded by the first wing, the second wing and the second end of the elongated section, the open area having a width "k" measured along at least one line that extends from the first wing to the second wing, the open area being accessible from above and below a plane that includes the first wing and the second wing so that an actuator arm can be positioned in the open space between the first wing and the second wing and extend above and below the first wing and the second wing;

an arm adapted for attachment to an actuator, the arm having a first edge, a second edge and a third edge, with the width "k" of the open area being sized so that the first wing and the second wing to not contact the first edge, the second edge or the third edge; and a first mount plate positioned over at least part of the arm and attached to the first wing and the second wing for securing the elongated section to the arm.

2. The suspension of claim 1 wherein the length "g" is at least approximately 9.3 mm.

3. The suspension of claim 1 wherein the width "k" is at least approximately 6.4 mm.

4. A suspension system for use in a magnetic disk drive comprising:

an arm adapted for attachment to an actuator, the arm comprising a first edge, a second edge, a third edge, a mount section and an aperture, the third edge forming a distal end of the arm, the mount section comprising a part of the arm circumscribed by the first edge, the second edge and the third edge, the mount section having a thickness "t" with the aperture extending completely through the thickness "t";

a first suspension comprising a first elongated section, a first wing and a second wing, the first elongated section having a first end and a second end, with the first wing abutting the second end of the first elongated section and being positioned adjacent to the first edge and extending beyond the aperture in the direction away from the distal end, the second wing abutting the second end of the first elongated section and being positioned adjacent to the second edge; and a first mount plate positioned over at least part of the mount section and attached to the first wing and the second wing, with the first wing being positioned so that no part of the first wing extends above or below the thickness "t" of the mount section in the region adjacent to the first edge of the mount section.

5. The suspension system of claim 4 further comprising;

a swage spud attached to the first mount plate which extends into the aperture and which has a length of less than approximately 0.21 mm.

6. The suspension system of claim 4 wherein the first elongated section has a length "h" and the first wing has a length "g" with the ratio of the length "g" to the length "h" being greater than 0.30.

7. The suspension system of claim 4 wherein the first wing has a length of approximately 9.3 mm.

8. The suspension system of claim 4 wherein the first mount plate is seated in contact with the mount section of the arm, and wherein no part of the first suspension is positioned between both the first mount plate and the mount section in a vertical direction.

9. The suspension system of claim 4 further comprising a first magnetic read/write slider positioned on the same side of the first suspension as the first mount plate.

10. The suspension system of claim 4 further comprising:

a second suspension comprising a second elongated section, a third wing and a fourth wing, the second elongated section having a first end and a second end, the third wing abutting the second end of the second elongated section and being positioned adjacent to the first side of the mount section and extending beyond the aperture in the direction away from the distal end, the fourth wing abutting the second end of the second elongated section and being positioned adjacent to the second side of the mount section; and a second mount plate positioned over at least part of the mount section and attached to the third wing and the fourth wing.

11. The suspension system of claim 10 wherein the second elongated section has a length "h" and the third wing has a length "g" with the ratio of the length "g" to the length "h" being greater than 0.30.

12. The suspension system claim 4 wherein the thickness "t" of the mount section is in the range of approximately 0.50 to 0.57 mm.

13. The suspension system of claim 4 further comprising;

a magnetic disk positioned adjacent to the first load beam and separated from the first mount plate by a distance "c".

14. The suspension system of claim 13 wherein the distance "c" is greater than 0.36 mm.

15. A magnetic disk file comprising:

a magnetic disk on which data can be written;

an actuator;

an arm attached to the actuator, the arm comprising a first edge, a second edge, a third edge, a mount section and an aperture, the third edge forming a distal end of the arm, the mount section comprising a part of the arm circumscribed by the first edge, the second edge and the third edge, the mount section having a thickness "t" with the aperture extending completely through the thickness "t";

a first suspension comprising an elongated section, a first wing and a second wing, the elongated section having a first end and a second end, with the first wing abutting the second end of the elongated section and being positioned adjacent to the first side of the mount section and extending beyond the aperture in the direction away from the distal end, the second wing abutting the second end of the elongated section and being positioned adjacent to the second side of the mount section; and a first mount plate positioned over at least part of the mount section and attached to the first wing and the second wing, with the first wing being positioned so that no part of the first wing extends above or below the thickness "t" of the mount section in the region adjacent to the first edge of the mount section.

16. The suspension system of claim 15 wherein the magnetic disk is positioned adjacent to the first mount plate and is separated from the first mount plate by a distance greater than 0.36 mm.

17. The suspension system of claim 15 wherein the first wing has a length of approximately 9.3 mm.

18. The suspension system of claim 15 wherein the thickness "t" of the mount section is in the range of approximately 0.50 to 0.57 mm.

19. A suspension system for use in a magnetic disk drive comprising:

an arm adapted for attachment to an actuator, the arm comprising a first edge, a second edge, a third edge and a mount section, the third edge forming a distal end of the arm, the mount section comprising a part of the arm circumscribed by the first edge, the second edge and the third edge, the mount section having a thickness "t";

a first suspension comprising a first elongated section, a first wing and a second wing, the first elongated section having a first end, a second end and a length "h," with the first wing having a length "g" and abutting the second end of the first elongated section and being positioned adjacent to the first edge and extending along the first edge in the direction away from the distal end, the second wing abutting the second end of the first elongated section and being positioned adjacent to the second edge, with the ratio of the length "g" to the length "h" being greater than 0.30; and a first mount plate positioned over at least part of the mount section and attached to the first wing and the second wing, with the first wing being positioned so that no part of the first wing extends above or below the thickness "t" of the mount section in the region adjacent to the first edge of the mount section.

20. The suspension system of claim 19 wherein the first mount plate is attached to the arm with an adhesive substance.

21. The suspension system of claim 20 wherein the thickness "t" of the mount section is in the range of approximately 0.40 to 0.57 mm.

22. The suspension system of claim 20 wherein the adhesive substance comprises a cyanoacrylate adhesive.

* * * * *